United States Patent [19]
Itoh

[11] Patent Number: 6,100,995
[45] Date of Patent: Aug. 8, 2000

[54] MULTI-FUNCTION DEVICE AND INFORMATION STORING MEDIUM THEREFOR

[75] Inventor: Shingo Itoh, Komaki, Japan

[73] Assignee: Brother Kogyo Kabushiki Kaisha, Nagoya, Japan

[21] Appl. No.: 08/914,223

[22] Filed: Aug. 19, 1997

[30] Foreign Application Priority Data

Aug. 21, 1996 [JP] Japan ................................. 8-219553

[51] Int. Cl.[7] .............................. B41B 15/00; H04N 1/32; H04N 1/40; H04N 1/00
[52] U.S. Cl. ...................... 358/1.16; 358/1.16; 358/1.15; 358/1.14; 358/1.13; 358/444; 358/404; 358/468
[58] Field of Search ................................. 395/115, 200.2; 358/468, 400, 407, 440, 404, 442, 444, 297, 296, 300, 302, 1.16, 1.13, 1.14, 1.15

[56] References Cited

U.S. PATENT DOCUMENTS

| | | | |
|---|---|---|---|
| 5,517,331 | 5/1996 | Murai et al. | 358/486 |
| 5,648,800 | 7/1997 | Takeda | 358/296 |
| 5,923,439 | 5/1997 | Tomida et al. | 358/404 |

*Primary Examiner*—Edward L. Coles
*Assistant Examiner*—Twyler Lamb
*Attorney, Agent, or Firm*—Oliff & Berridge, PLC

[57] ABSTRACT

A multi-function device connected to a computer includes a printer for printing on a recording paper, a modem for making facsimile communication, an interface for receiving printing data from the computer, a memory commonly used for the printer and the modem, and a controller for controlling the printer and the modem. The controller determines a capacity remainder of the memory. Further, the controller slows down a speed of receiving printing data from the computer upon determination that the capacity remainder of the memory is below a predetermined level while both of the printer and the modem are in operation.

23 Claims, 4 Drawing Sheets

MULTI-FUNCTION DEVICE AND INFORMATION STORING MEDIUM THEREFOR

BACKGROUND OF THE INVENTION

1. Field of the Invention

The present invention relates to a multi-function device connected to an information processing apparatus such as a computer for providing at least a printer function and a facsimile function. The present invention also relates to an information storing medium such as a ROM for use in such a multi-function device.

2. Description of the Related Art

In recent years, multi-function devices are increasingly used as peripheral equipments for information processing apparatuses such as personal computers. A typical example of a multi-function device is the one which has a printer function and a facsimile function.

In such a multi-function device, separate memory areas are allocated respectively for the printer function and the facsimile function, and the respective memory areas have a sufficient capacity. In this case, however, the overall memory capacity becomes inevitably great to result in a cost increase.

For avoiding such a cost increase, it is conceivable to use a memory of a relatively small capacity for both of the printer and and facsimile functions. In this case, however, since the facsimile function requires a relatively large portion of the memory, the memory is likely to reach a memory full state if the memory receives a large amount of printing data from the information processing apparatus to which the multi-function device is connected. As a result, the multi-function device is liable to malfunction due to errors resulting from the memory full state.

SUMMARY OF THE INVENTION

It is, therefore, an object of the present invention is to provide a multi-function device which is capable of preventing operation errors resulting from a memory full state while also realizing the common use of a memory for both of the printer and facsimile functions.

Another object of the present invention is provide an information storing medium for use in such a multi-function device.

According to one aspect of the present invention, there is provided a multi-function device which is connected to a separate information processing apparatus and which provides at least a printer function and a facsimile function, the multi-function device comprising: a memory commonly used for the printer and facsimile functions; capacity remainder determination means for determining a capacity remainder of the memory; and reception speed control means for slowing down a speed of receiving printing data from the information processing apparatus upon determination by the capacity remainder determination means that the capacity remainder of the memory is below a predetermined level while the multi-function device provides both of the printer and facsimile functions.

With the design described above, since the speed at which the memory receives the printing data from the information processing apparatus is slowed down when the memory becomes nearly full, the portion of the printing data previously stored in the memory may be outputted for printing to give an additional memory area for storing a subsequent portion of the printing data. Thus, it is possible to prevent the memory from becoming completely full, thereby avoiding operation errors which might result from the memory full state while also realizing a cost reduction due to the common use of the memory for both of the printer and facsimile functions.

The information processing apparatus connected to the multi-function device may be a personal computer or a work station for example, but these are not limitative.

Preferably, the reception speed control means comprises a timer for setting a pause period in which the printing data from the information processing apparatus are prevented from being supplied to the memory. Typically, the timer may be a downcounter.

In a preferred embodiment, the multi-function device further comprises an interface having a buffer for temporarily storing a predetermined fraction of the printing data from the information processing apparatus, whereby the predetermined fraction of the printing data stored in the buffer is transmitted to the memory only upon lapse of the pause period set by the timer.

The memory may be a RAM or an EEPROM. Further, the capacity remainder determination means and the reception speed control means may be provided by operating a central processing unit of the multi-function device on the basis of a suitable program.

According to another aspect of the present invention, there is provided a multi-function device which is connected to an information processing apparatus, the multi-function device comprising: a printer for printing on a recording paper; communication means for making facsimile communication; an interface for receiving printing data from the information processing apparatus; a memory commonly used for the printer and the communication means; and a controller for controlling the printer and the communication means; wherein the controller determines a capacity remainder of the memory, the controller further slowing down a speed of receiving printing data from the information processing apparatus upon determination that the capacity remainder of the memory is below a predetermined level while both of the printer and the communication means are in operation.

According to a further aspect of the present invention, there is provided an information storing medium used for operating a multi-function device which is connected to a separate information processing apparatus and which provides at least a printer function and a facsimile function, the multi-function device comprising a memory commonly used for the printer and facsimile functions, the medium storing: a capacity remainder determination program for determining a capacity remainder of the memory; and a reception speed control program for slowing down a speed of receiving printing data from the information processing apparatus upon determination that the capacity remainder of the memory is below a predetermined level while the multi-function device provides both of the printer and facsimile functions.

The information storing medium may be a ROM, a flexible disk or a CD-ROM for example, but these are not limitative.

Other objects, features and advantages of the present invention will be apparent from the detailed description of a preferred embodiment given below with reference to the accompanying drawings.

DETAILED DESCRIPTION OF THE PREFERRED EMBODIMENT

The preferred embodiment of the present invention will be described below with reference to the accompanying drawings.

Figure 1:
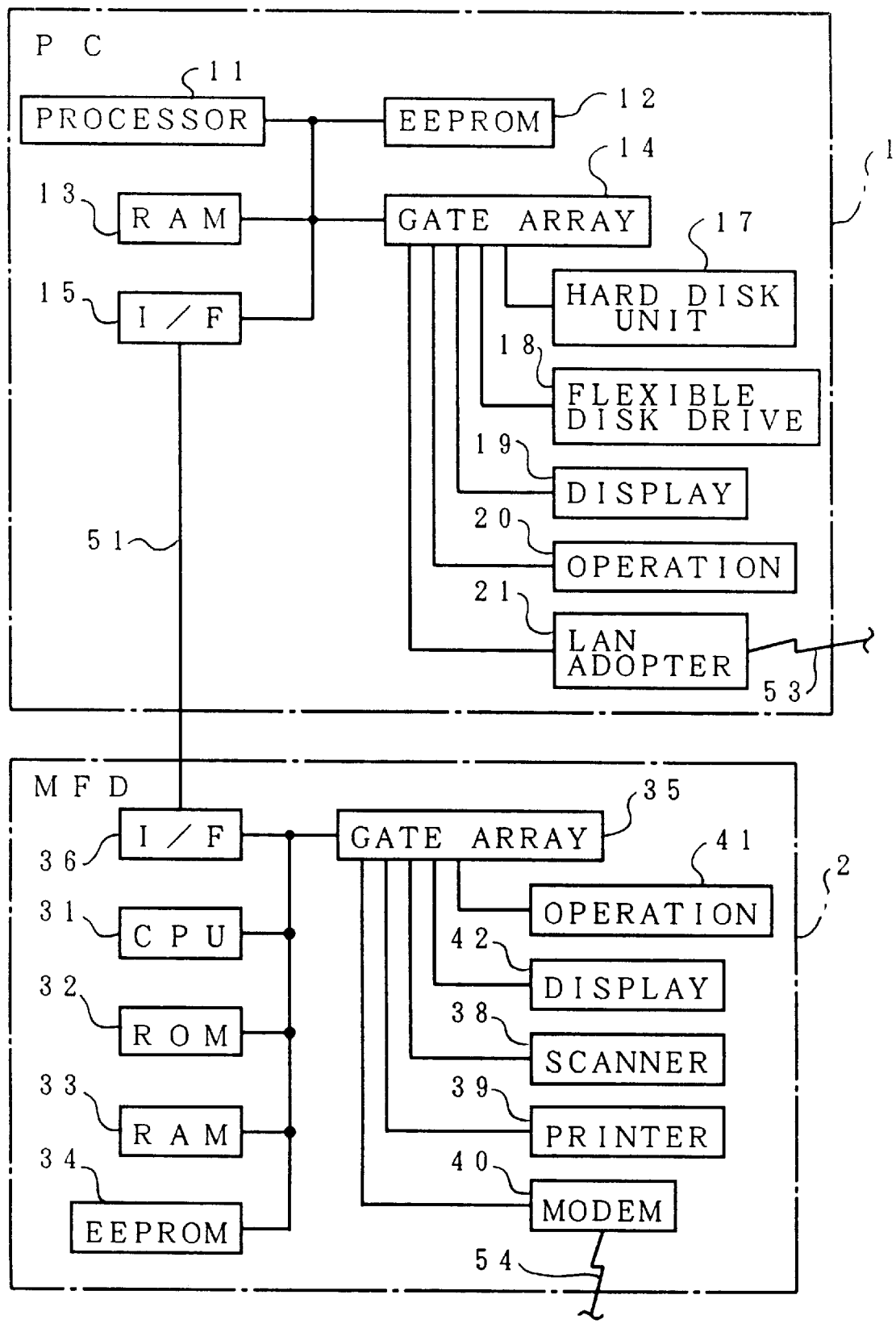
FIG. 1 is a circuit block diagram showing a multi-function device combined with a personal computer in accordance with the present invention.

Reference is first made to FIG. 1 which is a circuit block diagram schematically showing a multi-function device 2 connected to a personal computer 1 in accordance with an embodiment of the present invention. The personal computer 1 may be of the so-called "GUI (graphical user interface)" type which is capable of holding a plurality of windows active at the same time. The multi-function device 2 (hereafter abbreviated as "MFD") provides a plurality of functions such as facsimile function, printer function, image scanner function and copy function.

The personal computer 1 comprises a processor 11, an EEPROM (electrically erasable and programmable ROM) 12, a RAM (random access memory) 13, a gate array 14, an interface 15, a hard disk unit 17, a flexible disk drive 18, a display unit 19, an operation unit 20, and a LAN adaptor 21. The processor 11, the EEPROM 12, the RAM 13, the gate array 14 and the interface 15 are connected to each other via bus lines (digital lines) which include data bus lines, address bus lines and control signal bus lines. The gate array 14 is connected to the hard disk unit 17, the flexible disk drive 18, the display unit 19, the operation unit 20 and the LAN adaptor 21, respectively. The LAN adaptor 21 is connected to a LAN (local area network).

The processor 11 operates on the operating system and various application programs installed at the hard disk unit 17 for providing an overall control of the personal computer 1.

The EEPROM 12 stores registered data (e.g. shortcut dials) and/or flags.

The RAM 13, which is utilized by various application programs, stores various digital data such as image data or text data.

The gate array 14 functions as an I/O interface (input/output interface) for the processor for data transmission to and/or from the hard disk unit 17, the flexible disk drive 18, the display unit 19, the operation section 20 and the LAN adaptor 21.

The interface 15 may be a Centronics interface for enabling data transmission between the personal computer 1 and the MFD 2.

The hard disk unit 17 stores an operating system and various application programs.

The flexible disk drive 18 is used to read out the contents of a flexible disk (not shown) and writes data thereto.

The display unit 19 may comprise a LCD (liquid crystal display) for providing various indications (letters and/or designs) under the control of the processor 11.

The operation unit 20 may include key switches and/or a mouse to be operated by the user for output of operation signals.

The LAN adaptor 21 serves as an interface between the personal computer 1 and the LAN 53.

The MFD 2 comprises a CPU (central processing unit) 31, a ROM (read-only memory) 32, a RAM (random access memory) 33, an EEPROM 34, a gate array 35, an interface 36, a scanner 38, a printer 39, a modem (modulator-demodulator) 40, an operation unit 41, and a display unit 42. The CPU 31, the ROM 32, the RAM 33, the EEPROM 34, the gate array 35 and the interface 36 are connected to each other via bus lines (digital lines) which include data bus lines, address bus lines and control signal bus lines. The gate array 35 is connected to the scanner 38, the printer 39, the modem 40, the operation unit 41 and the display unit 42, respectively. The interface 36 is connected to the interface 15 of the personal computer 1 via a cable 51, whereas the modem 40 is connected to a telephone line 54.

The CPU 31 provides an overall control of the MFD 2.

The ROM 32 stores various programs or the like as required for controlling the MFD 2.

The RAM 33 stores various digital data such as text data an/or image data.

The EEPROM 34 stores registered data and/or flags.

The gate array 35 functions as an I/O interface for the CPU 31 for data transmission to and/or from the scanner 38, the printer 39, the modem 40, the operation unit 41 and the display unit 42.

The interface 36 may be a Centronics interface for enabling data transmission between the personal computer 1 and the MFD 2 in cooperation with the interface 15 of the personal computer 1.

The scanner 38 reads the image data of document papers (not shown) for output through the gate array 17. Though not shown in the drawings, the scanner 39 may include an array of LEDs (light emitting diodes) as a light source, an array of CCDs (charge coupled devices) as an image sensor, and a motor for feeding each document paper.

The printer 39 performs printing of images on a recording paper (not shown) on the basis of the image data received through the gate array 35.

The modem 40 modulates and demodulates the carrier waves for facsimile transmission and reception of data when the MFD 2 works as a facsimile machine.

The operation unit 41 may include key switches or the like to be operated by the user for output of operation signals.

The display unit 42 may include an LCD or the like for providing various indications under the control of the CPU 31.

The hard disk unit 17 of the personal computer 1 stores, as part of application programs, an MFD control software for utilizing the modem 40 of the MFD 2 to make facsimile communications with a remote facsimile machine (not shown), for causing the printer 39 to print out the texts and images prepared at the personal computer 1, and for causing the scanner 38 to send the scanned images to the personal computer 1. Such a control software may be installed in the hard disk unit 17, for example, by inserting a suitable installation disk in the flexible disk drive 18 followed by performing predetermined installation steps. Typically, the MFD control software may include a fax driver which is a data conversion program for converting text data into bit map data, a log manager program for monitoring and displaying communication history, and a status monitor program for controlling data transmission between the personal computer 1 and the MFD 2.

Figure 2:
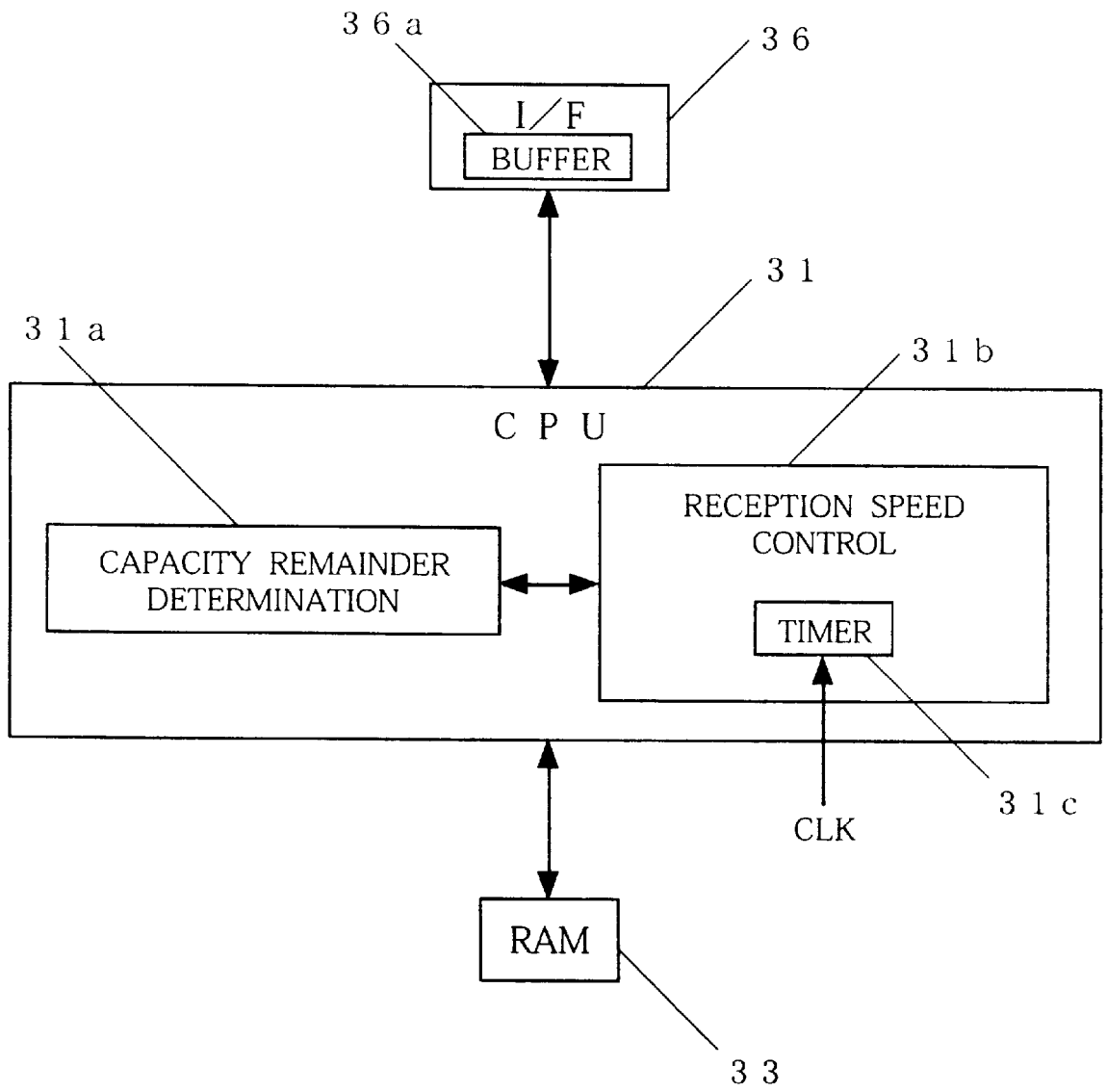
FIG. 2 is a block diagram showing the central processing unit of the same multi-function device.

As shown in FIG. 2, the CPU 31 of the MFD 2 provides a capacity remainder determination means 31a for determining how much the capacity of the RAM 33 remains, and a reception speed control means 31b for slowing down the speed of data reception from the personal computer 1 when the capacity remainder of the RAM lowers below a predetermined level while the MFD 2 provides both of the facsimile and printer functions. The receiving speed control means 31b includes a timer 31c for determining the length of a pause period in which the RAM 33 is prevented from receiving data from the personal computer 1. Typically, the timer 31c may be a downcounter.

As also shown in FIG. 2, the interface 36 of the MFD 2 includes a buffer 36a for temporarily and successively storing a predetermined fraction of the data received from the personal computer before sending to the RAM 33 under the control of the CPU 31. While the timer 31c of the receiving speed control means 31b of the CPU 31 is actuated, the data transmission from the buffer 36a of the interface 36 to the RAM 33 is prevented, so that the speed of data transmission from the personal computer 1 to the MFD 2 can be slowed down depending on the setting of the timer 31c.

For enabling the CPU 31 to provide the intended data reception speed control, the ROM 32 of the MFD 2 stores a capacity remainder determination program for determining how much the capacity of the RAM 33 remains, and a reception speed control program for slowing down the speed of data reception from the personal computer 1 when the capacity remainder of the RAM lowers below a predetermined level while the MFD 2 provides both of the facsimile and printer functions. Alternatively, the MFD 2 may include a different or additional storing medium for storing these programs.

The MFD 2 thus designed and combined with the personal computer 1 operates in the following manner.

In the facsimile transmission mode, the scanner 38 reads the images of a document paper for output of image data. The image data thus obtained are processed at the CPU 31 for conversion to facsimile transmission data which are modulated at the modem 40 for transmission through the telephone line 54.

In the facsimile reception mode, input image data received from a remote facsimile machine (not shown) are demodulated at the modem 40 and processed at the CPU 31 which causes the printer 39 to print out the received image data on a recording paper (not shown).

In each of the facsimile transmission or reception modes, a considerable portion of the RAM 33 is allocated exclusively for such a purpose. Assuming for example that the capacity of the RAM 33 is 1 M byte, about 500 K byte of the RAM 33 may be allocated exclusively for the facsimile transmission or reception. Therefore, the capacity remainder of the RAM 33 is less than 500 K byte.

On the other hand, if printing data are supplied from the personal computer 1 to the CPU 31 through the cable 51 and the interface 36, the CPU 31 processes the printing data for output to the printer 39. At this time, since the RAM 33 is utilized as a buffer for the processing of the printing data at the CPU 31, the printing data are accumulated progressively at the RAM 33 as the amount of the received printing data increases. Particularly, if the printer 39 is a page printer, the RAM 33 must cumulatively store at least as much of the printing data as corresponding to one full page of the text or image. Thus, the RAM 33 may reach a memory full state which may cause operation errors.

For avoiding such operation errors, the personal computer 1 may be made to completely stop sending more of the printing data if the RAM 33 becomes nearly full. In this case, however, the personal computer 1 may erroneously recognize, upon lapse of a certain time, that the printer 39 is in error.

According to the present embodiment, the reception speed control means 31b of the CPU 31 functions to slow down the speed at which the RAM 33 receives the printing data from the personal computer 1 if the capacity remainder of the RAM 33 reduces below a predetermined level (e.g. 10 K byte) while the MFD 2 operates in the facsimile transmission or reception mode. As a result, it is possible to reduce the amount of the printing data accumulated in the RAM 33, thereby preventing a memory-full state of the RAM 33 in the course of facsimile transmission or reception. If the facsimile transmission or reception finishes, the capacity remainder of the RAM 33 increases drastically or abruptly so that the CPU 31 operates to resume the normal state wherein the RAM 33 receives the printing data from the personal computer 1 at the normal speed.

Figure 3:
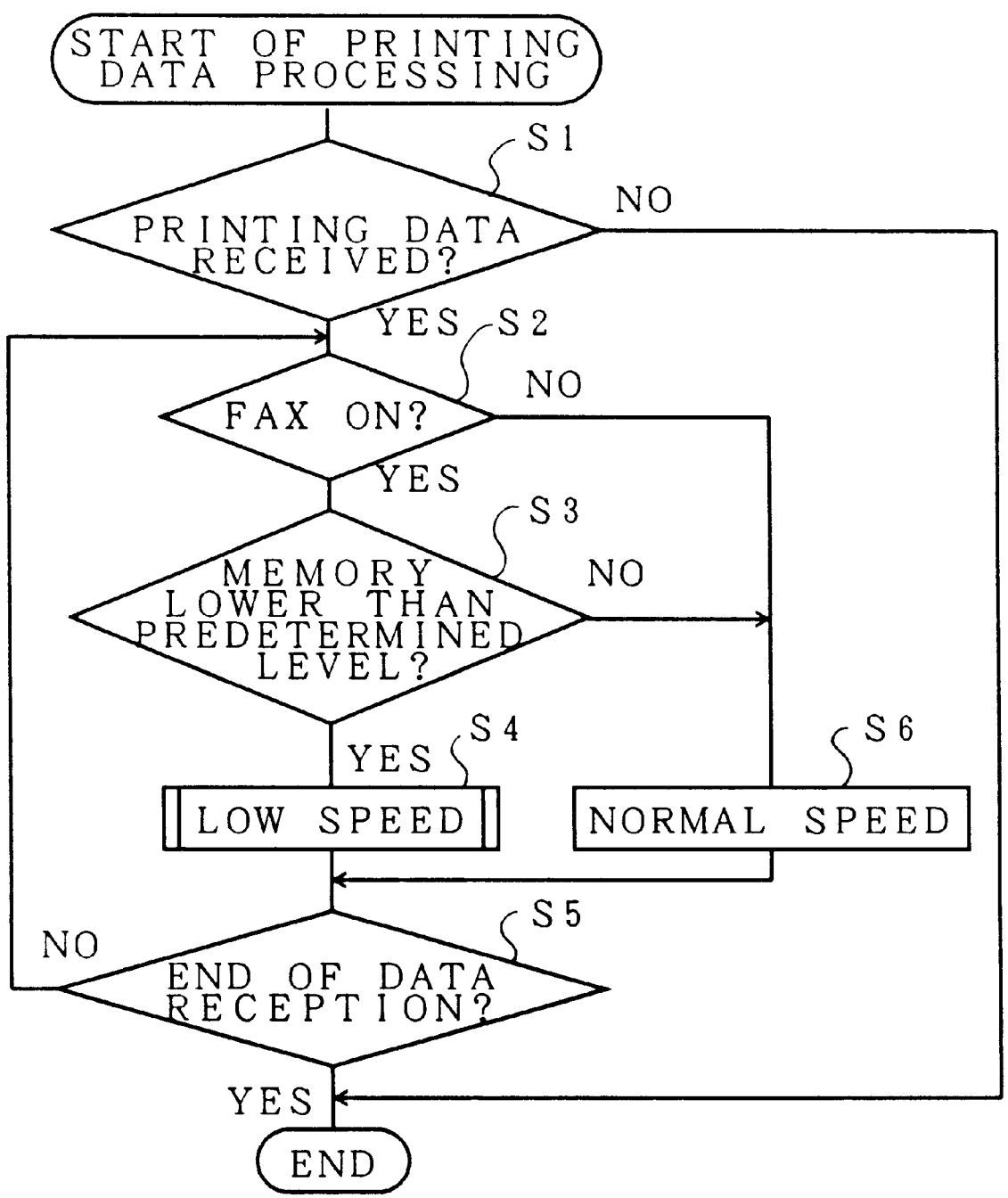
FIG. 3 is a flow diagram showing the steps of processing the printing data received from the personal computer.

The above steps of processing the printing data are more specifically described with reference to the flow diagram illustrated in FIG. 3.

First, the CPU 31 of the MFD 2 determines whether it receives the printing data (Step S1). More specifically, the CPU 31 checks whether the printing data are supplied from the personal computer 1 to the interface 36 through the cable 51.

If "Yes" in Step S1, the CPU 31 then determines whether the MFD 2 is currently operating for facsimile transmission or reception (Step S2).

If "Yes" in Step S2, the capacity remainder determination means 31a of the CPU 31 determines whether the memory remainder of the RAM 33 is below a predetermined level which may be 10 K byte for example (Step S3).

If "Yes" in Step S3, the reception speed control means 31b of the CPU 31 starts low-speed reception of the printing data (Step S4), as more specifically described hereinafter.

Then, the CPU 31 determines whether the supply of the printing data from the personal computer 1 terminates (Step S5).

If "Yes" in Step S5, the above routine of processing the printing data finishes.

If "No" in Step S5, the process steps are repeated by returning to Step S2. The capacity remainder of the RAM 33 may become above the predetermined level due to termination of the facsimile function for example before the supply of the printing data to the CPU 31 terminates. This is why the process steps are repeated by returning to Step S2 instead of Step S4.

In Step S3, if the capacity remainder of the RAM 33 is determined not to be below the predetermined level ("No" in Step S3), the CPU 31 receives the printing data from the personal computer 1 at a normal speed (Step S6), and Step S5 follows. Under this condition, if the facsimile transmission or reception terminates in a relatively short time, all of the printing data may be received without shifting to the low-speed reception control so that the printing data may be processed at a relatively high speed.

In Step S2, if the MFD 2 is determined not to be under facsimile transmission or reception ("No" in Step S2), the normal speed data reception of Step 6 follows because the capacity remainder of the RAM 33 is unlikely to become insufficient.

In Step S1, if the CPU 31 determines that no printing data is received from the personal computer 1 ("No" in Step S1), the printing data processing routine terminates immediately. Such a routine is performed constantly at a predetermined time interval, so that the printing data reception from the personal computer 1 is monitored substantially at all times.

Figure 4:
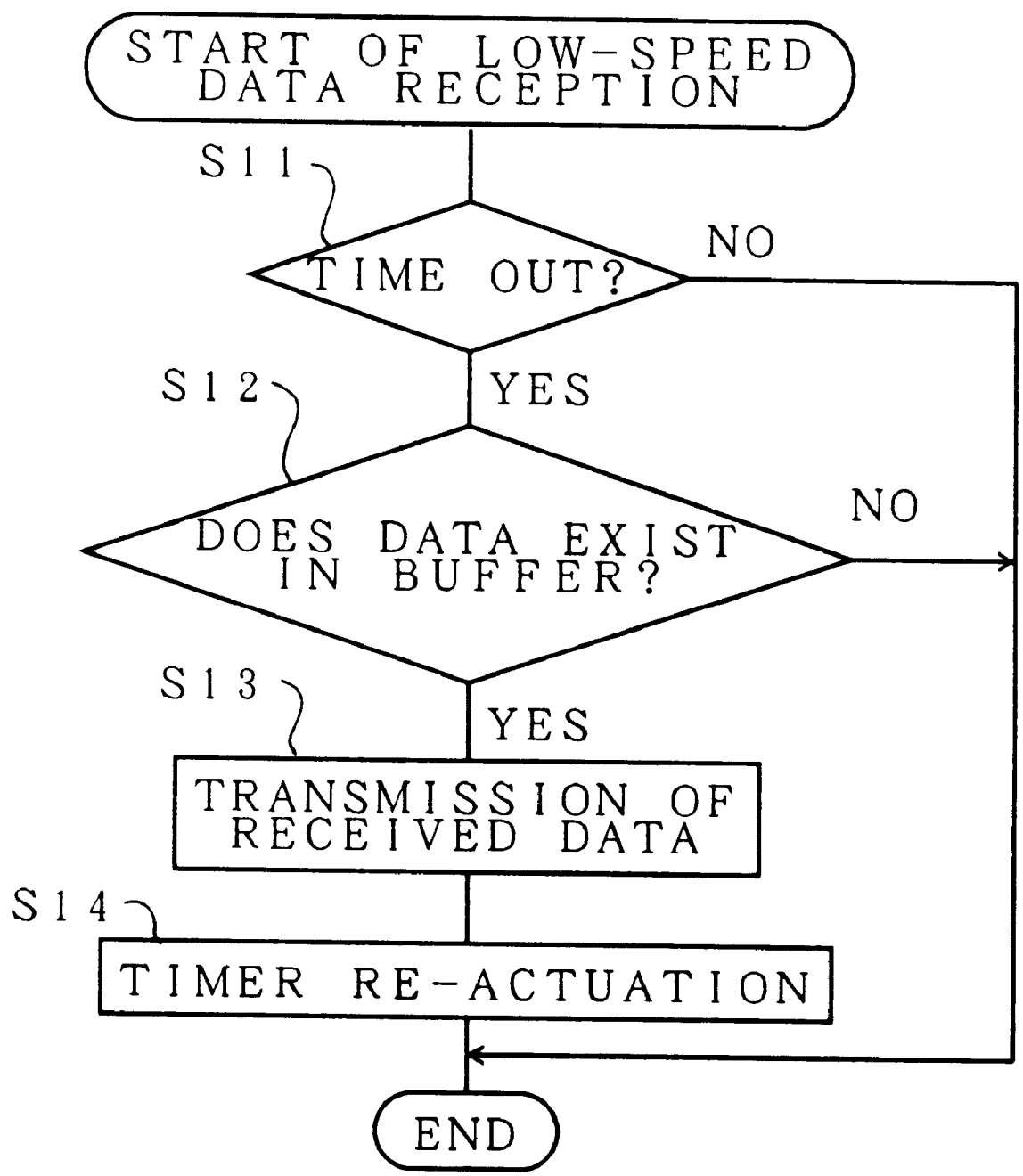
FIG. 4 is a flow diagram illustrating the steps of low-speed data reception.

Next, reference is made to the flow diagram illustrated in FIG. 4 for more specifically describing the process steps for performing the low-speed reception of the printing data.

The low-speed reception of the printing data starts upon actuation of the timer 31c (see FIG. 2) of the reception speed control means 31b when the capacity remainder determination means 31a determines that the capacity remainder of the RAM 33 is below the predetermined level (e.g. 10 K byte) in Step S3 (see FIG. 3).

The timer 31c, which may be a downcounter, sets a pause period in which the CPU 31 (and thereby the RAM 33) is prevented from receiving the printing data from the personal computer 1. Thus, the length of the time interval set by the timer 31c represents the speed at which the CPU 31 receives the printing data from the personal computer 1.

In Step S11, the reception speed control means 31b of the CPU 31 determines whether the pause period set by the timer 31c has lapsed.

If "Yes" in Step S11, the CPU 31 then determines whether the buffer 36a of the interface 36 (see FIG. 2) stores a predetermined fraction of the printing data from the personal computer 1 (Step S12). More specifically, only a 1-byte fraction of the printing data from the personal computer 1 is stored in the buffer 36a of the interface 36 at one time, and a next 1-byte fraction of the printing data is supplied to the buffer 36a only after the buffer 36a transmits the currently held fraction of the printing data to the CPU 31.

If "Yes" in Step S12, the reception speed control means 31b of the CPU 31 transmits the 1-byte fraction of the printing data from the buffer 36a to the RAM 33 (Step S13). As a result, the buffer 36a is allowed to receive the next 1-byte fraction of the printing data from the personal computer 1.

Then, the reception speed control means 31b re-actuates the timer 31c and terminates the above routine (Step S14). In case where the timer 31c is a downcounter, a predetermined value is set at the downcounter. The value of the downcounter decrements one by one in synchronism with clock signals and ultimately reduces to zero upon lapse of a predetermined time (pause period).

In Step S12, if the buffer 36a of the interface 36 holds no fraction of the printing data from the personal computer 1 ("No" in Step S12), the low-speed data reception control routine terminates here since no data need be sent to the RAM 33.

In Step S11, if the pause period set by the timer 31c has not yet lapsed ("No" in Step S11), the low-speed data reception control terminates here.

The low-speed data reception control routine described above is performed repetitively at a time interval which is sufficiently shorter than the pause period set by the timer 31c. Thus, the time-out state of the timer 31c is monitored substantially at all times.

In this way, the RAM 33 receives the printing data from the personal computer 1 only 1-byte by 1-byte at the predetermined time interval. Thus, by suitably setting the pause period (value) of the timer 31c (downcounter), it is possible to prevent the RAM 33 from becoming full.

According to the embodiment described above, the timer 31c is initially actuated immediately when the capacity remainder determination means 31a determines that the capacity remainder of the RAM 33 is below the predetermined level (e.g 10 K byte). Alternatively, however, the timer 31c need not be actuated immediately when the capacity remainder determination means 31a determines that the capacity remainder of the RAM 33 is below the predetermined level. In the latter case, the timer 31c is initially in its time-out state ("Yes" in Step S11), and the timer 31c is first actuated only after a 1-byte fraction of the printing data is transmitted from the buffer 36a to the RAM 33 (Steps S12–S14).

The present invention being thus described, it is obvious that the same may be varied in many ways. Such variations should not be regarded as a departure from the spirit and scope of the present invention, and all such modifications as would be obvious to those skilled in the art are intended to be included within the scope of the following claims.

I claim:

1. A multi-function device which is connected to a separate information processing apparatus and which provides at least a printer function and a facsimile function, the multi-function device comprising:

a memory commonly used for the printer and facsimile functions;

capacity remainder determination means for determining a capacity remainder of the memory; and reception speed control means for slowing down a speed at which the memory receives printing data from the information processing apparatus upon determination by the capacity remainder determination means that the capacity remainder of the memory is below a predetermined level while the multi-function device provides both of the printer and facsimile functions.

2. The multi-function device according to claim 1, wherein the reception speed control means comprises a timer for setting a pause period in which the printing data from the information processing apparatus are prevented from being supplied to the memory.

3. The multi-function device according to claim 2, wherein the timer is a downcounter.

4. The multi-function device according to claim 2, further comprising an interface having a buffer for temporarily storing a predetermined fraction of the printing data from the information processing apparatus, the predetermined fraction of the printing data stored in the buffer being transmitted to the memory only upon lapse of the pause period set by the timer.

5. The multi-function device according to claim 1, wherein the memory is a random access memory.

6. The multi-function device according to claim 1, wherein the capacity remainder determination means and the reception speed control means are incorporated in a central processing unit of the multi-function device.

7. A multi-function device which is connected to an information processing apparatus, the multi-function device comprising:

a printer for printing on a recording paper;

communication means for making facsimile communication;

an interface for receiving printing data from the information processing apparatus;

a memory commonly used for the printer and the communication means; and a controller for controlling the printer and the communication means;

wherein the controller determines a capacity remainder of the memory, the controller further slowing down a speed at which the memory receives printing data from the information processing apparatus upon determination that the capacity remainder of the memory is below a predetermined level while both of the printer and the communication are in operation.

8. The multi-function device according to claim 7, wherein the controller comprises a timer for setting a pause period in which the printing data from the information processing apparatus are prevented from being supplied to the memory through the interface.

9. The multi-function device according to claim 8, wherein the timer is a downcounter.

10. The multi-function device according to claim 8, wherein the interface comprises a buffer for temporarily storing a predetermined fraction of the printing data from the information processing apparatus, the predetermined fraction of the printing data stored in the buffer being transmitted to the memory only upon lapse of the pause period set by the timer.

11. The multi-function device according to claim 7, wherein the memory is a random access memory.

12. The multi-function device according to claim 7, wherein the controller comprises a central processing unit of the multi-function device.

13. An information storing medium used for operating a multi-function device which is connected to a separate information processing apparatus and which provides at least a printer function and a facsimile function, the multi-function device comprising a memory commonly used for the printer and facsimile functions, the medium storing:

a capacity remainder determination program for determining a capacity remainder of the memory; and a reception speed control program for slowing down a speed at which the memory receives printing data from the information processing apparatus upon determination that the capacity remainder of the memory is below a predetermined level while the multi-function device provides both of the printer and facsimile functions.

14. A multi-function device comprising:

a printing unit;

a memory commonly used at least for a printer function and another function;

determination means for determining whether or not the multi-function device is in a predetermined condition; and control means for controlling a speed of print data input to the memory in response to the determination of the determination means.

15. The multi-function device according to claim 14, wherein said predetermined condition is a condition in which a capacity remainder of the memory becomes below a predetermined level while the memory is simultaneously used both for the printer function and said another function.

16. The multi-function device according to claim 14, wherein said another function is a facsimile function.

17. The multi-function device according to claim 14, wherein the control means controls the speed of print data input to decrease to a minimum speed when the multi-function device is determined to be in said predetermined condition.

18. The multi-function device according to claim 14, wherein the control means controls the speed of print data input to increase to a maximum speed when the multi-function device is determined not to be in said predetermined condition.

19. A multi-function device comprising:

a printing unit;

a memory commonly used at least for a printer function and another function;

determination means for determining whether or not the multi-function device is in a predetermined condition; and control means for switching a speed of print data input to the memory between different speeds in response to the determination of the determination means.

20. The multi-function device according to claim 19, wherein said predetermined condition is a condition in which a capacity remainder of the memory becomes below a predetermined level while the memory is simultaneously used both of the printer function and said another function.

21. The multi-function device according to claim 19, wherein said another function is a facsimile function.

22. The multi-function device according to claim 19, wherein the control means switches the speed of print data input to a minimum speed when the multi-function device is determined to be in said predetermined condition.

23. The multi-function device according to claim 19, wherein the control means switches the speed of print data input to a maximum speed when the multi-function device is determined not to be in said predetermined condition.

* * * * *